US008700388B2

(12) United States Patent
Edler et al.

(10) Patent No.: US 8,700,388 B2
(45) Date of Patent: Apr. 15, 2014

(54) AUDIO TRANSFORM CODING USING PITCH CORRECTION

(75) Inventors: Bernd Edler, Hannover (DE); Sascha Disch, Fuerth (DE); Ralf Geiger, Nuremberg (DE); Stefan Bayer, Nuremberg (DE); Ulrich Kraemer, Ilmenau (DE); Guillaume Fuchs, Erlangen (DE); Max Neuendorf, Nuremberg (DE); Markus Multrus, Nuremberg (DE); Gerald Schuller, Erfurt (DE); Harald Popp, Tuchenbach (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 1037 days.

(21) Appl. No.: 12/668,912

(22) PCT Filed: Mar. 23, 2009

(86) PCT No.: PCT/EP2009/002118
§ 371 (c)(1), (2), (4) Date: Mar. 19, 2010

(87) PCT Pub. No.: WO2009/121499
PCT Pub. Date: Oct. 8, 2009

(65) Prior Publication Data

US 2010/0198586 A1 Aug. 5, 2010

Related U.S. Application Data

(60) Provisional application No. 61/042,314, filed on Apr. 4, 2008.

(30) Foreign Application Priority Data

Dec. 8, 2008 (EP) .................................... 08021298

(51) Int. Cl.

| | |
|---|---|
| *G10L 11/04* | (2006.01) |
| *G10L 21/00* | (2013.01) |
| *G10L 15/00* | (2013.01) |
| *G10L 19/14* | (2006.01) |
| *G10L 19/02* | (2013.01) |
| *G10L 13/06* | (2013.01) |

(52) U.S. Cl.
USPC ........... 704/207; 704/500; 704/501; 704/503; 704/504; 704/241; 704/205; 704/204; 704/267

(58) Field of Classification Search
USPC .......... 704/207, 500–504, 241, 205, 204, 267
See application file for complete search history.

(56) References Cited

U.S. PATENT DOCUMENTS

| | | | | |
|---|---|---|---|---|
| 5,567,901 | A | 10/1996 | Gibson et al. | |
| 6,226,616 | B1 | 5/2001 | You et al. | |
| 6,330,533 | B2 | 12/2001 | Su et al. | |
| 6,449,590 | B1 * | 9/2002 | Gao | 704/219 |
| 6,879,955 | B2 * | 4/2005 | Rao | 704/241 |
| 7,222,070 | B1 * | 5/2007 | Stachurski et al. | 704/207 |
| 7,228,272 | B2 * | 6/2007 | Rao | 704/219 |
| 7,280,969 | B2 * | 10/2007 | Eide et al. | 704/268 |
| 7,778,827 | B2 | 8/2010 | Jelinek et al. | |
| 8,380,496 | B2 * | 2/2013 | Ramo et al. | 704/207 |
| 2003/0004718 | A1 * | 1/2003 | Rao | 704/241 |
| 2007/0055397 | A1 | 3/2007 | Steinberg | |
| 2007/0100607 | A1 * | 5/2007 | Villemoes | 704/207 |
| 2007/0276657 | A1 | 11/2007 | Gournay et al. | |
| 2009/0157395 | A1 * | 6/2009 | Su et al. | 704/207 |
| 2010/0204998 | A1 * | 8/2010 | Villemoes | 704/500 |
| 2011/0158415 | A1 * | 6/2011 | Bayer et al. | 381/22 |
| 2011/0161088 | A1 * | 6/2011 | Bayer et al. | 704/500 |
| 2011/0178795 | A1 * | 7/2011 | Bayer et al. | 704/205 |
| 2013/0144611 | A1 * | 6/2013 | Ishikawa et al. | 704/207 |

FOREIGN PATENT DOCUMENTS

| | | | |
|---|---|---|---|
| EP | 1 141 945 | B1 | 2/2005 |
| EP | 1 758 101 | A1 | 2/2007 |
| EP | 1 807 825 | B1 | 5/2008 |
| RU | 2 316 059 | C2 | 6/2006 |
| TW | 334557 | A | 6/1998 |
| TW | 446935 | A | 7/2001 |
| TW | 565826 | A | 12/2003 |
| TW | 200719319 | A | 5/2007 |

| | | | |
|---|---|---|---|
| WO | 93/04467 | A1 | 3/1993 |
| WO | 96/22592 | A1 | 7/1996 |
| WO | 2007/051548 | A1 | 5/2007 |
| WO | 2009/121499 | A1 | 10/2009 |

OTHER PUBLICATIONS

Edler, B et al., "A Time-Warped MDCT Approach to Speech Transform Coding", 126th AES Convention. Munich, Germany, May 2009, pp. 1-8.*

Yang et al.; "Pitch Synchronous Modulated Lapped Transform of the Linear Prediction Residual of Speech"; Proceedings of the International Conference on Signal Processing 1998; vol. 1; Oct. 12, 1998; pp. 591-594.

Edler; "Coding of Audio Signals With Overlapping Block Transform and Adaptive Window Functions"; Frequenz, Schiele und Schoen;vol. 43; Nr. 9; pp. 252-256; Sep. 1989.

Official Communication issued in International Patent Application No. PCT/EP2009/002118, mailed on Aug. 25, 2009.

English translation of Official Communication issued in corresponding Malaysian Patent Application No. PI 20095416, mailed on Aug. 15, 2011.

* cited by examiner

*Primary Examiner* — Edgar Guerra-Erazo

(74) *Attorney, Agent, or Firm* — Keating & Bennett, LLP

(57) ABSTRACT

A processed representation of an audio signal having a sequence of frames is generated by sampling the audio signal within first and second frames of the sequence of frames, the second frame following the first frame, the sampling using information on a pitch contour of the first and second frames to derive a first sampled representation. The audio signal is sampled within the second and third frames, the third frame following the second frame in the sequence of frames. The sampling uses the information on the pitch contour of the second frame and information on a pitch contour of the third frame to derive a second sampled representation. A first scaling window is derived for the first sampled representation, and a second scaling window is derived for the second sampled representation, the scaling windows depending on the samplings applied to derive the first sampled representations or the second sampled representation.

21 Claims, 16 Drawing Sheets

AUDIO TRANSFORM CODING USING PITCH CORRECTION

BACKGROUND OF THE INVENTION

Several embodiments of the present invention relate to audio processors for generating a processed representation of a framed audio signal using pitch-dependent sampling and re-sampling of the signals.

Cosine or sine-based modulated lapped transforms corresponding to modulated filter banks are often used in applications in source coding due to their energy compaction properties. That is, for harmonic tones with constant fundamental frequencies (pitch), they concentrate the signal energy to a low number of spectral components (sub-bands), which leads to efficient signal representations. Generally, the pitch of a signal shall be understood to be the lowest dominant frequency distinguishable from the spectrum of the signal. In the common speech model, the pitch is the frequency of the excitation signal modulated by the human throat. If only one single fundamental frequency would be present, the spectrum would be extremely simple, comprising the fundamental frequency and the overtones only. Such a spectrum could be encoded highly efficient. For signals with varying pitch, however, the energy corresponding to each harmonic component is spread over several transform coefficients, thus, leading to a reduction of coding efficiency.

One could try to improve coding efficiency for signals with varying pitch by first creating a time-discrete signal with a virtually constant pitch. To achieve this, the sampling rate could be varied proportionally to the pitch. That is, one could re-sample the whole signal prior to the application of the transform such that the pitch is as constant as possible within the whole signal duration. This could be achieved by non-equidistant sampling, wherein the sampling intervals are locally adaptive and chosen such that the re-sampled signal, when interpreted in terms of equidistant samples, has a pitch contour closer to a common mean pitch than the original signal. In this sense, the pitch contour shall be understood to be the local variation of the pitch. The local variation could, for example, be parameterized as a function of a time or sample number.

Equivalently, this operation could be seen as a rescaling of the time axis of a sampled or of a continuous signal prior to an equidistant sampling. Such a transform of time is also known as warping. Applying a frequency transform to a signal which was preprocessed to arrive at a nearly constant pitch, could approximate the coding efficiency to the efficiency achievable for a signal having a generically constant pitch.

The previous approach, however, does have several drawbacks. First, a variation of the sampling rate over a large range, as necessitated by the processing of the complete signal, could lead to a strongly varying signal bandwidth due to the sampling theorem. Secondly, each block of transform coefficients representing a fixed number of input samples would then represent a time segment of varying duration in the original signal. This would make applications with limited coding delay nearly impossible and, furthermore, would result in difficulties in synchronization.

A further method is proposed by the applicants of the international patent application 2007/051548. The authors propose a method to perform the warping on a per-frame basis. However, this is achieved by introducing undesirable constraints to the applicable warp contours applicable.

Therefore, the need exists for alternate approaches to increase the coding efficiency, at the same time maintaining a high quality of the encoded and decoded audio signals.

SUMMARY

According to an embodiment, an audio processor for generating a processed representation of an audio signal having a sequence of frames may have: a sampler adapted to sample the audio signal within a first and a second frame of the sequence of frames, the second frame following the first frame, the sampler using information on a pitch contour of the first and the second frame to derive a first sampled representation and to sample the audio signal within the second and a third frame, the third frame following the second frame in the sequence of frames using the information on the pitch contour of the second frame and information on a pitch contour of the third frame to derive a second sampled representation; a transform window calculator adapted to derive a first scaling window for the first sampled representation and a second scaling window for the second sampled representation, the scaling windows depending on the sampling applied to derive the first sampled representation or the second sampled representation; and a windower adapted to apply the first scaling window to the first sampled representation and the second scaling window to the second sampled representation to derive a processed representation of the first, second and third audio frames of the audio signal.

According to another embodiment, an audio processor for processing a first sampled representation of a first and a second frame of an audio signal having a sequence of frames in which the second frame follows the first frame and for processing a second sampled representation of the second frame and of a third frame of the audio signal following the second frame in the sequence of frames may have: a transform window calculator adapted to derive a first scaling window for the first sampled representation using information on a pitch contour of the first and the second frame and to derive a second scaling window for the second sampled representation using information on a pitch contour of the second and the third frames, wherein the scaling windows have an identical number of samples and wherein a first number of samples used to fade out the first scaling window differs from a second number of samples used to fade in the second scaling window; a windower adapted to apply the first scaling window to the first sampled representation and to apply the second scaling window to the second sampled representation; and a re-sampler adapted to re-sample the first scaled sampled representation to derive a first re-sampled representation using the information on the pitch contour of the first and the second frame and to re-sample the second scaled sampled representation to derive a second re-sampled representation using the information on the pitch contour of the second and the third frames, the re-sampling depending on the scaling windows derived.

According to another embodiment, a method for generating a processed representation of an audio signal having a sequence of frames may have the steps of: sampling the audio signal within a first and a second frame of the sequence of frames, the second frame following the first frame, the sampling using information on a pitch contour of the first and the second frame to derive a first sampled representation; sampling the audio signal within the second and a third frame, the third frame following the second frame in the sequence of frames, the sampling using the information on the pitch contour of the second frame and information on a pitch contour of the third frame to derive a second sampled representation; deriving a first scaling window for the first sampled representation and a second scaling window for the second sampled representation, the scaling windows depending on the samplings applied to derive the first sampled representation or the second sampled representation; and applying the first scaling window to the first sampled representation and applying the second scaling window to the second sampled representation.

According to another embodiment, a method for processing a first sampled representation of a first and a second frame of an audio signal having a sequence of frames in which the second frame follows the first frame and for processing a second sampled representation of the second frame and of a third frame of the audio signal following the second frame in the sequence of frames may have the steps of: deriving a first scaling window for the first sampled representation using information on a pitch contour of the first and the second frame and deriving a second scaling window for the second sampled representation using information on a pitch contour of the second and the third frame, wherein the scaling windows are derived such that they have an identical number of samples, wherein a first number of samples used to fade out the first scaling window differs from a second number of samples used to fade in the second scaling window; applying the first scaling window to the first sampled representation and the second scaling window to the second sampled representation; and re-sampling the first scaled sampled representation to derive a first re-sampled representation using the information on the pitch contour of the first and the second frame and re-sampling the second scaled sampled representation to derive a second re-sampled representation using the information on the pitch contour of the second and the third frame the re-sampling depending on the scaling windows derived.

According to another embodiment, a computer program, when running on a computer, may implement a method for generating a processed representation of an audio signal having a sequence of frames, wherein the method may have the steps of: sampling the audio signal within a first and a second frame of the sequence of frames, the second frame following the first frame, the sampling using information on a pitch contour of the first and the second frame to derive a first re-sampled representation; sampling the audio signal within the second and a third frame, the third frame following the second frame in the sequence of frames, the sampling using the information on the pitch contour of the second frame and information on a pitch contour of the third frame to derive a second sampled representation; deriving a first scaling window for the first sampled representation and a second scaling window for the second sampled representation, the scaling windows depending on the samplings applied to derive the first sampled representations or the second sampled representation; and applying the first scaling window to the first sampled representation and applying the second scaling window to the second sampled representation.

According to another embodiment, a computer program, when running on a computer, may implement a method for processing a first sampled representation of a first and a second frame of an audio signal having a sequence of frames in which the second frame follows the first frame and for processing a second sampled representation of the second frame and of a third frame of the audio signal following the second frame in the sequence of frames, wherein the method may have the steps of: deriving a first scaling window for the first sampled representation using information on a pitch contour of the first and the second frame and deriving a second scaling window for the second sampled representation using information on a pitch contour of the second and the third frame, wherein the scaling windows are derived such that they have an identical number of samples, wherein a first number of samples used to fade out the first scaling window differs from a second number of samples used to fade in the second scaling window; applying the first scaling window to the first sampled representation and the second scaling window to the second sampled representation; and re-sampling the first scaled sampled representation to derive a first re-sampled representation using the information on the pitch contour of the first and the second frame and re-sampling the second scaled sampled representation to derive a second re-sampled representation using the information on the pitch contour of the second and the third frame the re-sampling depending on the scaling windows derived.

Several embodiments of the present invention allow for an increase in coding-efficiency by performing a local transformation of the signal within each signal block (audio frame) in order to provide for a (virtually) constant pitch within the duration of each input block contributing to one set of transform coefficients in a block-based transform. Such an input block may, for example be created by two consecutive frames of an audio signal when a modified discrete cosine transform is used as a frequency-domain transformation.

When using a modulated lapped transform, like the modified discrete cosine transform (MDCT), two successive blocks input into the frequency domain transform overlap in order to allow for a cross-fade of the signal at the block borders, such as to suppress audible artifacts of the blockwise processing. An increase of the number of transform coefficients as compared to a non-overlapping transform is avoided by critical sampling. In MDCT, applying the forward and the backward transform to one input block does, however, not lead to its full reconstruction as, due to the critical sampling, artifacts are introduced into the reconstructed signal. The difference between the input block and the forward and backward transformed signal is usually referred to as "time domain aliasing". By overlapping the reconstructed blocks by one half the block width after reconstruction and by adding the overlapped samples, the input signal can, nonetheless, be perfectly reconstructed in the MDCT scheme. According to some embodiments, this property of the modified direct cosine transform can be maintained even when the underlying signal is time-warped on a per-block basis (which is equivalent to the application of locally adaptive sampling rates).

As previously described, sampling with locally-adaptive sampling rates (a varying sampling rate) may be regarded as uniform sampling on a warped time scale. In this view, a compaction of the time scale prior to sampling leads to a lower-effective sampling rate, while a stretching increases the effective sampling rate of the underlying signal.

Considering a frequency transform or another transform, which uses overlap and add in the reconstruction in order to compensate for possible artifacts, time-domain aliasing cancellation still works if the same warping (pitch correction) is applied in the overlapping region of two successive blocks. Such, the original signal can be reconstructed after inverting the warping. This is also true when different local sampling rates are chosen in the two overlapping transform blocks, since the time domain aliasing of the corresponding continuous time signal still cancels out, given that the sampling theorem is fulfilled.

In some embodiments, the sampling rate after time warping the signal within each transform block is selected individually for each block. This has the effect that a fixed number of samples still represents a segment of fixed duration in the input signal. Furthermore, a sampler may be used, which samples the audio signal within overlapping transform blocks using information on the pitch contour of the signal such that the overlapping signal portion of a first sampled representation and of a second sampled representation has a similar or an identical pitch contour in each of the sampled representations. The pitch contour or the information on the pitch contour used for sampling may be arbitrarily derived, as long as there is an unambiguous interrelation between the information on the pitch contour (the pitch contour) and the pitch of the signal. The information on the pitch contour used may, for example, be the absolute pitch, the relative pitch (the pitch change), a fraction of the absolute pitch or a function depending unambiguously on the pitch. Choosing the information on the pitch contour as indicated above, the portion of the first sampled representation corresponding to the second frame has a pitch contour similar to the pitch contour of the portion of the second sampled representation corresponding to the second frame. The similarity may, for example, be, that the pitch values of corresponding signal portions have a more or less constant ratio, that is, a ratio within a predetermined tolerance range. The sampling may thus be performed such that the portion of the first sampled representation corresponding to the second frame has a pitch contour within a predetermined tolerance range of a pitch contour of the portion of the second sampled representation corresponding to the second frame.

Since the signal within the transform blocks can be re-sampled with different sampling frequencies or sampling intervals, input blocks are created which may be encoded efficiently by a subsequent transform coding algorithm. This can be achieved while, at the same time, applying the derived information on the pitch contour without any additional constraints as long as the pitch contour is continuous.

Even if no relative pitch change within a single input block is derived, the pitch contour may be kept constant within and at the boundaries of those signal intervals or signal blocks having no derivable pitch change. This may be advantageous when pitch tracking fails or is erroneous, which might be the case for complex signals. Even in this case, pitch-adjustment or re-sampling prior to transform coding does not provide any additional artifacts.

The independent sampling within the input blocks may be achieved by using special transform windows (scaling windows) applied prior to or during the frequency-domain transform. According to some embodiments, these scaling windows depend on the pitch contour of the frames associated to the transform blocks. In general terms, the scaling windows depend on the sampling applied to derive the first sampled representation or the second sampled representation. That is, the scaling window of the first sampled representation may depend on the sampling applied to derive the first scaling window only, on the sampling applied to derive the second scaling window only or on both, the sampling applied to derive the first scaling window and the sampling applied to derive the second scaling window. The same applies, mutatis mutandis, to the scaling window for the second sampled representation.

This provides for the possibility to assure that no more than two subsequent blocks overlap at any time during the overlap and add reconstruction, such that time-domain aliasing cancellation is possible.

In particular, the scaling windows of the transform are, in some embodiments, created such that they may have different shapes within each of the two halves of each transform block. This is possible as long as each window half fulfills the aliasing cancellation condition together with the window half of the neighboring block within the common overlap interval.

As the sampling rates of the two overlapping blocks may be different (different values of the underlying audio signals correspond to identical samples), the same number of samples may now correspond to different portions of the signal (signal shapes). However, the previous requirement may be fulfilled by reducing the transition length (samples) for a block with a lower-effective sampling rate than its associated overlapping block. In other words, a transform window calculator or a method to calculate scaling windows may be used, which provides scaling windows with an identical number of samples for each input block. However, the number of samples used to fade out the first input block may be different from the number of samples used to fade in the second input block. Thus, using scaling windows for the sampled representations of overlapping input blocks (a first sampled representation and a second sampled representation), which depend on the sampling applied to the input blocks, allows for a different sampling within the overlapping input blocks, at the same time preserving the capability of an overlap and add reconstruction with time-domain aliasing cancellation.

In summarizing, the ideally-determined pitch contour may be used without requiring any additional modifications to the pitch contour while, at the same time, allowing for a representation of the sampled input blocks, which may be efficiently coded using a subsequent frequency domain transform.

Other features, elements, steps, characteristics and advantages of the present invention will become more apparent from the following detailed description of preferred embodiments of the present invention with reference to the attached drawings.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
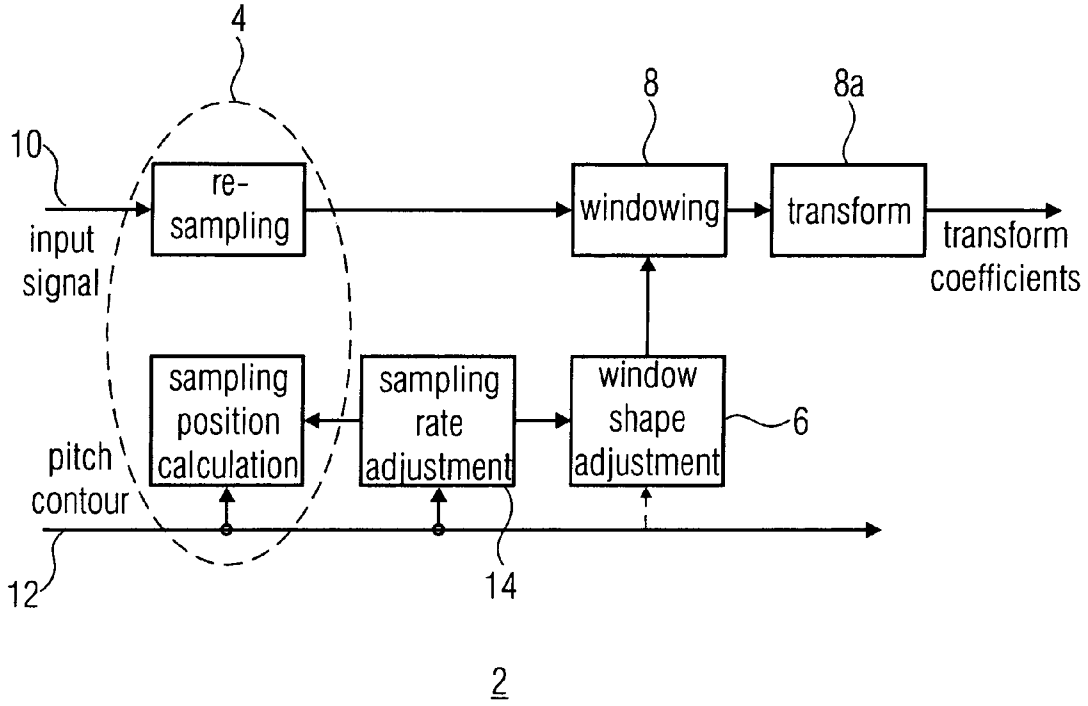
FIG. 1 shows an embodiment of an audio processor for generating a processed representation of an audio signal with a sequence of frames.

FIG. 1 shows an embodiment of an audio processor 10 (input signal) for generating a processed representation of an audio signal having a sequence of frames. The audio processor 2 comprises a sampler 4, which is adapted to sample an audio signal 10 (input signal) input in the audio processor 2 to derive the signal blocks (sampled representations) used as a basis for a frequency domain transform. The audio processor 2 further comprises a transform window calculator 6 adapted to derive scaling windows for the sampled representations output from the sampler 4. These are input into a windower 8, which is adapted to apply the scaling windows to the sampled representations derived by sampler 4. In some embodiments, the windower may additionally comprise a frequency domain transformer 8*a* in order to derive frequency-domain representations of the scaled sampled representations. These may then be processed or further transmitted as an encoded representation of the audio signal 10. The audio processor further uses a pitch contour 12 of the audio signal, which may be provided to the audio processor or which may, according to a further embodiment, be derived by the audio processor 2. The audio processor 2 may, therefore, optionally comprise a pitch estimator for deriving the pitch contour.

The sampler 4 might operate on a continuous audio signal or, alternatively, on a pre-sampled representation of the audio signal. In the latter case, the sampler may re-sample the audio signal provided at its input as indicated in FIGS. 2*a* to 2*d*. The sampler is adapted to sample neighboring overlapping audio blocks such that the overlapping portion has the same or a similar pitch contour within each of the input blocks after the sampling.

Figure 3:
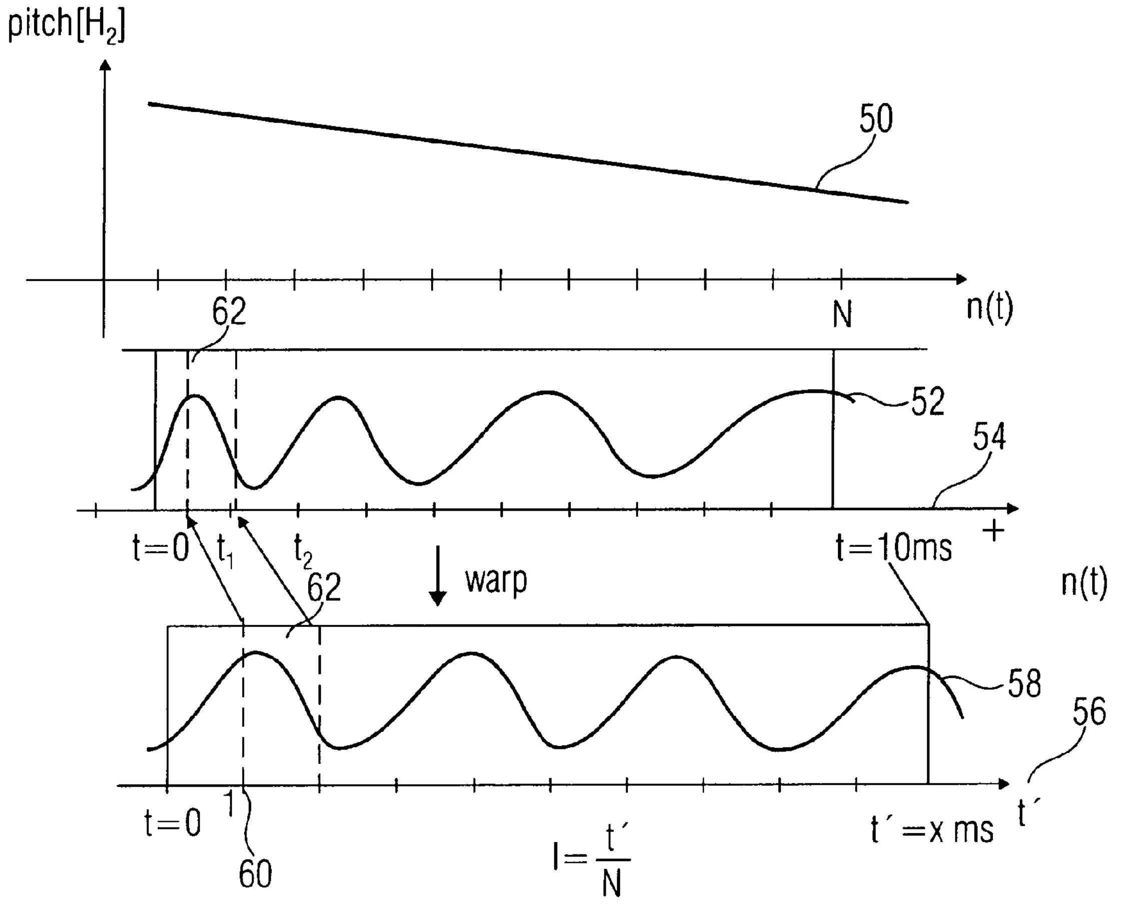
FIG. 3 shows an example as to how to associate the sampling positions used for sampling and the sampling positions of an input signal with equidistant samples.
Figure 4:
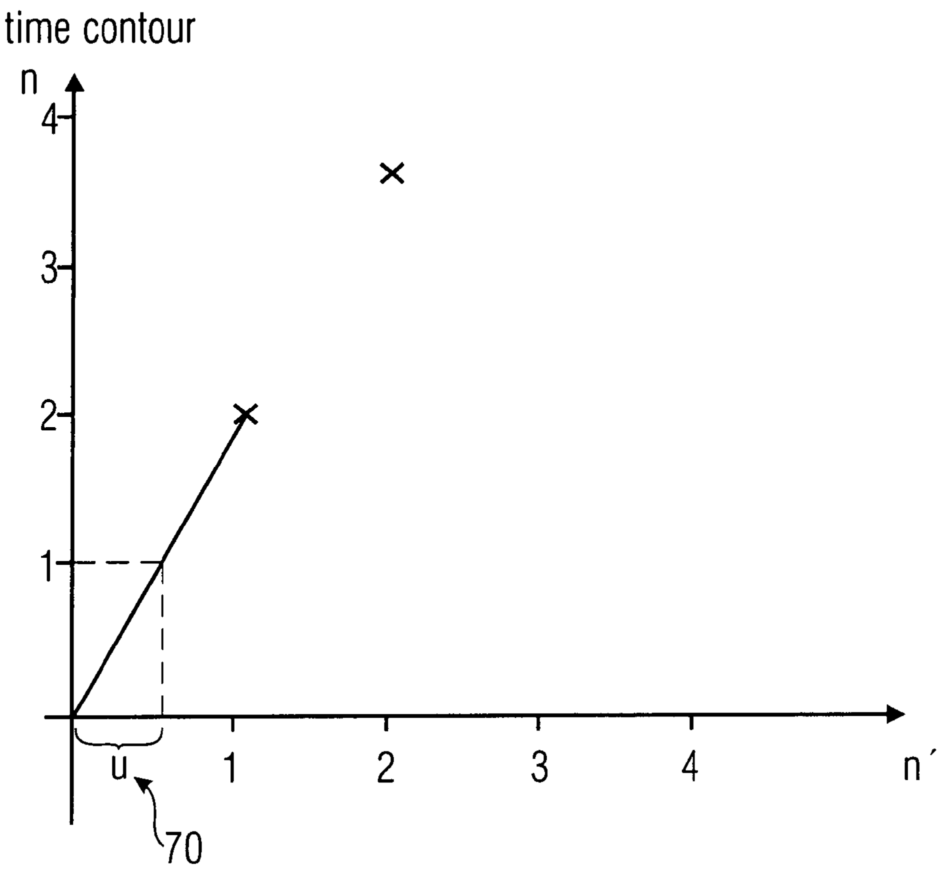
FIG. 4 shows an example for a time contour used to determine the sampling positions for the sampling.

The case of a pre-sampled audio signal is elaborated in more detail in the description of FIGS. 3 and 4.

The transform window calculator 6 derives the scaling windows for the audio blocks depending on the re-sampling performed by the sampler 4. To this end, an optional sampling rate adjustment block 14 may be present in order to define a re-sampling rule used by the sampler, which is then also provided to the transform window calculator. In an alternative embodiment, the sampling rate adjustment block 14 may be omitted and the pitch contour 12 may be directly provided to the transform window calculator 6, which may itself perform the appropriate calculations. Furthermore, the sampler 4 may communicate the applied sampling to the transform window calculator 6 in order to enable the calculation of appropriate scaling windows.

The re-sampling is performed such that a pitch contour of sampled audio blocks sampled by the sampler 4 is more constant than the pitch contour of the original audio signal within the input block. To this end, the pitch contour is evaluated, as indicated for one specific example in FIGS. 2*a* and 2*d*.

Figure 2A:
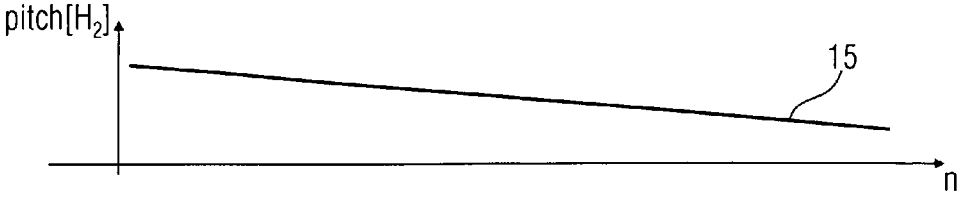
FIGS. 2*a* to 2*d* show an example for the sampling of an audio input signal depending on the pitch contour of the audio input signal using scaling windows depending on the sampling applied.
Figure 2B:
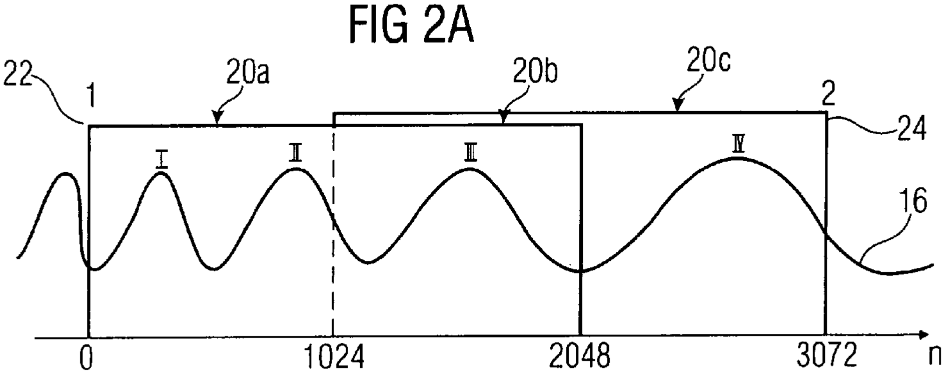

FIG. 2*a* shows a linearly decaying pitch contour as a function of the numbers of samples of the pre-sampled input audio signal. That is, FIGS. 2*a* to 2*d* illustrate a scenario where the input audio signals are already provided as sample values. Nonetheless, the audio signals before re-sampling and after re-sampling (warping the time scale) are also illustrated as continuous signals in order to illustrate the concept more clearly. FIG. 2*b* shows an example of a Sine-signal 16 having a sweeping frequency decreasing from higher frequencies to lower frequencies. This behavior corresponds to the pitch contour of FIG. 2*a*, which is shown in arbitrary units. It is, again, pointed out that time warping of the time axis is equivalent to a re-sampling of the signal with locally adaptive sampling intervals.

In order to illustrate the overlap and add processing, FIG. 2*b* shows three consecutive frames 20*a*, 20*b* and 20*c* of the audio signal, which are processed in a block-wise manner having an overlap of one frame (frame 20*b*). That is, a first signal block 22 (signal block 1) comprising the samples of the first frame 20*a* and the second frame 20*b* is processed and re-sampled and a second signal block 24 comprising the samples of the second frame 20*b* and the third frame 20*c* is re-sampled independently. The first signal block 22 is re-sampled to derive the first re-sampled representation 26 shown in FIG. 2*c* and the second signal block 24 is re-sampled to the second re-sampled representation 28 shown in FIG. 2*d*. However, the sampling is performed such that the portions corresponding to the overlapping frame 20*b* have the same or only a slightly-deviating (within a predetermined tolerance range identical) pitch contour in the first sampled representation 26 and the second sampled representation 28. This is, of course, only true when the pitch is estimated in terms of sample numbers. The first signal block 22 is re-sampled to the first re-sampled representation 26, having a (idealized) constant pitch. Thus, using the sample values of the re-sampled representation 26 as an input for a frequency domain transform, ideally only one single frequency coefficient would be derived. This is evidentially an extremely efficient representation of the audio signal. Details as to how the re-sampling is performed will, in the following, be discussed referencing FIGS. 3 and 4. As becomes apparent from FIG. 2*c*, the re-sampling is performed such that the axis of the sample positions (the x-axis), which corresponds to the time axis in an equidistantly sampled representation is modified such that the resulting signal shape has only one single pitch frequency. This corresponds to a time warping of the time axis and to a subsequent equidistant sampling of the time-warped representation of the signal of the first signal block 22.

The second signal block 24 is re-sampled such that the signal portion corresponding to the overlapping frame 20*b* in the second re-sampled representation 28 has an identical or only a slightly deviating pitch contour than the corresponding signal portion of the re-sampled representation 26. However, the sampling rates differ. That is, identical signal shapes within the re-sampled representations are represented by different numbers of samples. Nevertheless, each re-sampled representation, when coded by a transform coder, results in a highly efficient encoded representation having only a limited number of non-zero frequency coefficients.

Figure 2C:
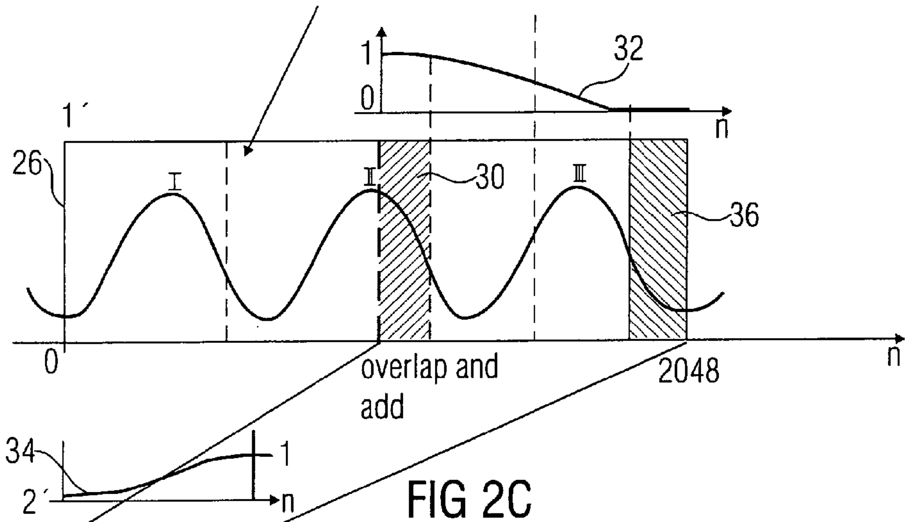
Figure 2D:
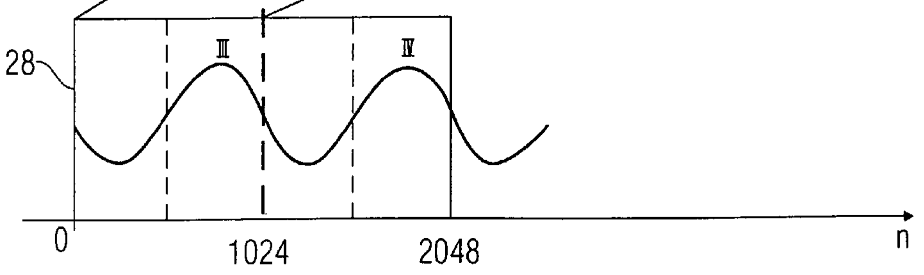

Due to the re-sampling, signal portions of the first half of signal block 22 are shifted to samples belonging to the second half of the signal block of the re-sampled representation, as indicated in FIG. 2*c*. In particular, the hatched area 30 and the corresponding signal right to the second peak (indicated by II) is shifted into the right half of the re-sampled representation 26 and is, thus, represented by the second half of the samples of the re-sampled representation 26. However, these samples have no corresponding signal portion in the left half of the re-sampled representation 28 of FIG. 2*d*.

In other words, while re-sampling, the sampling rate is determined for each MDCT block such that the sampling rate leads to a constant duration in a linear time of the block center, which contains N-samples in the case of a frequency resolution of N and a maximum window length of 2N. In the previously described example of FIGS. 2*a* to 2*d*, N=1024 and, consequently, 2N=2048 samples. The re-sampling performs the actual signal interpolation at the needed positions. Due to the overlap of two blocks, which may have different sampling rates, the re-sampling has to be performed twice for each time segment (equaling one of the frames 20*a* to 20*c*) of the input signal. The same pitch contour, which controls the encoder or the audio processor performing the encoding, can be used to control the processing needed to invert the transform and the warping, as it may be implemented within an audio decoder. In some embodiments, the pitch contour is, therefore, transmitted as side information. In order to avoid a miss-match between an encoder and a corresponding decoder, some embodiments of encoders use the encoded and, subsequently, decoded pitch contour rather than the pitch contour as originally derived or input. However, the pitch contour derived or input may, alternatively, be used directly.

In order to ensure that only corresponding signal portions are overlapped in the overlap and add reconstruction, appropriate scaling windows are derived. These scaling windows have to account for the effect that different signal portions of the original signals are represented within the corresponding window halves of the re-sampled representations, as it is caused by the previously described re-sampling.

Appropriate scaling windows may be derived for the signals to be encoded, which depend on the sampling or re-sampling applied to derive the first and second sampled representations 26 and 28. For the example of the original signal illustrated in FIG. 2*b* and the pitch contour illustrated in FIG. 2*a*, appropriate scaling windows for the second window half of the first sampled representation 26 and for the first window half of the second sampled representation 28 are given by the first scaling window 32 (its second half) and by the second scaling window 34, respectively (the left half of the window corresponding to the first 1024 samples of the second sampled representation 28).

As the signal portion within the hatched area 30 of the first sampled representation 26 has no corresponding signal portion in the first window half of the second sampled representation 28, the signal portion within the hatched area has to be completely reconstructed by the first sampled representation 26. In an MDCT reconstruction, this may be achieved when the corresponding samples are not used for fading in or out, that is, when the samples receive a scaling factor of 1. Therefore, the samples of the scaling window 32 corresponding to the hatched area 30, are set to unity. At the same time, the same number of samples should be set to 0 at the end of the scaling window in order to avoid a mixing of those samples with the samples of the first shaded area 30 due to the inherent MDCT transform and inverse transform properties.

Due to the (applied) re-sampling, which achieves an identical time warping of the overlapping window segment, those samples of the second shaded area 36 also have no signal counterpart within the first window half of the second sampled representation 28. Thus, this signal portion can be fully reconstructed by the second window half of the second sampled representation 28. Setting the samples of the first scaling window corresponding to the second shaded area 36 to 0 is therefore feasible without loosing information on the signal to be reconstructed. Each signal portion present within the first window half of the second sampled representation 28 has a corresponding counterpart within the second window half of the first sampled representation 26. Therefore, all samples within the first window half of the second sampled representation 28 are used for the cross-fade between the first and the second sampled representations 26 and 28, as it is indicated by the shape of the second scaling window 34.

In summarizing, pitch dependent re-sampling and using appropriately designed scaling windows allows to apply an optimum pitch contour, which does not need to meet any constraints apart from being continuous. Since, for the effect of increasing the coding efficiency, only relative pitch changes are relevant, the pitch contour can be kept constant within and at the boundaries of signal intervals in which no distinct pitch can be estimated or in which no pitch variation is present. Some alternate concepts propose to implement time warping with specialized pitch contours or time warping functions, which have special restrictions with respect to their contours. Using embodiments of the invention, the coding efficiency will be higher, since the optimal pitch contour can be used at any time.

With respect to FIGS. 3 to 5, one particular possibility to perform the re-sampling and to derive the associated scaling windows shall now be described in more detail.

The sampling is, again, based on a linearly decreasing pitch contour 50, corresponding to a predetermined number of samples N. The corresponding signal 52 is illustrated in normalized time. In the chosen example, the signal is 10 milliseconds long. If a pre-sampled signal is processed, the signal 52 is normally sampled in equidistant sampling intervals, such as indicated by the tick-marks of the time axis 54. If one would apply time warping by appropriately transforming the time axis 54, the signal 52 would, on a warped time scale 56, become a signal 58, which has a constant pitch. That is, the time difference (the difference of numbers of samples) between neighboring maxima of the signal 58 are equal on the new time scale 56. The length of the signal frame would also change to a new length of x milliseconds, depending on the warping applied. It should be noted that the picture of time warping is only used to visualize the idea of non-equidistant re-sampling used in several embodiments of the present invention, which may, indeed, be implemented only using the values of the pitch contour 50.

The following embodiment, which describes as to how the sampling may be performed is, for the ease of understanding, based on the assumption that the target pitch to which the signal shall be warped (a pitch derived from the re-sampled or sampled representation of the original signal) is unity. However, it goes without saying that the following considerations can easily be applied to arbitrary target pitches of the signal segments processed.

Assuming the time warping would be applied in a frame j starting at sample jN in such a way that it forces the pitch to unity (1), the frame duration after time warping would correspond to the sum of the N corresponding samples of the pitch contour:

$$D_j = \sum_{i=0}^{N-1} \text{pitch\_contour}_{jN+xi}$$

That is, the duration of the time warped signal 58 (the time t'=x in FIG. 3) is determined by the above formula.

In order to obtain N-warped samples, the sampling interval in the time warped frame j equals:

$$I_j = N/D_j$$

A time contour, which associates the positions of the original samples in relation to the warped MDCT window, can be iteratively constructed according to:

$$\text{time\_contour}_{i+1} = \text{time\_contour}_i + \text{pitch\_contour}_{jN+i} * I_j$$

An example of a time contour is given in FIG. 4. The x-axis shows the sample number of the re-sampled representation and the y-axis gives the position of this sampling number in units of samples of the original representation. In the example of FIG. 3, the time contour is, therefore, constructed with ever-decreasing step-size. The sample position associated to sample number 1 in the time warped representation (axis n') in units of the original samples is, for example, approximately 2. For the non-equidistant, pitch-contour dependent re-sampling, the positions of the warped MDCT input samples are necessitated in units of the original un-warped time scale. The position of warped MDCT-input sample i (y-axis) may be obtained by searching for a pair of original sample positions k and k+1, which define an interval including i:

$$\text{time\_contour}_k \le i < \text{time\_contour}_{k+1}.$$

For example, sample i=1 is located in the interval defined by sample k=0, k+1=1. A fractional part u of the sample position is obtained assuming a linear time contour between k=1 and k+1=1 (x-axis). In general terms, the fractional part 70 (u) of sample i is determined by:

$$u = \frac{i - \text{time\_contour}_k}{\text{time\_contour}_{k+1} - \text{time\_contour}_k}.$$

Thus, the sampling position for the non-equidistant re-sampling of the original signal 52 may be derived in units of original sampling positions. Therefore, the signal can be re-sampled such that the re-sampled values correspond to a time-warped signal. This re-sampling may, for example, be implemented using a polyphase interpolation filter h split into P sub-filters $h_p$ with an accuracy of 1/P original sample intervals. For this purpose, the sub-filter index may be obtained from the fractional sample position:

$$P = \lfloor uP \rfloor,$$

and the warped MDCT input sample $xw_i$ may then be calculated by convolution:

$$xw_i = x_k * h_{p,k}.$$

Of course, other re-sampling methods may be used, such as, for example, spline-based re-sampling, linear interpolation, quadratic interpolation, or other re-sampling methods.

After having derived the re-sampled representations, appropriate scaling windows are derived in such a way that none of the two overlapping windows ranges more than N/2 samples in the center area of the neighboring MDCT frame. As previously described, this may be achieved by using the pitch-contour or the corresponding sample intervals $I_j$ or, equivalently, the frame durations $D_j$. The length of a "left" overlap of frame j (i.e. the fade-in with respect to the preceding frame j−1) is determined by:

$$\sigma l_j = \begin{cases} N/2 & \text{if } D_j \le D_{j-1} \\ N/2 * D_{j-1}/D_j & \text{else,} \end{cases}$$

and the length of the "right" overlap of frame j (i.e. the fade-out to the subsequent frame j+1) is determined by:

$$\sigma r_j = \begin{cases} N/2 & \text{if } D_j \le D_{j+1} \\ N/2 * D_{j+1}/D_j & \text{else} \end{cases}.$$

Figure 5:
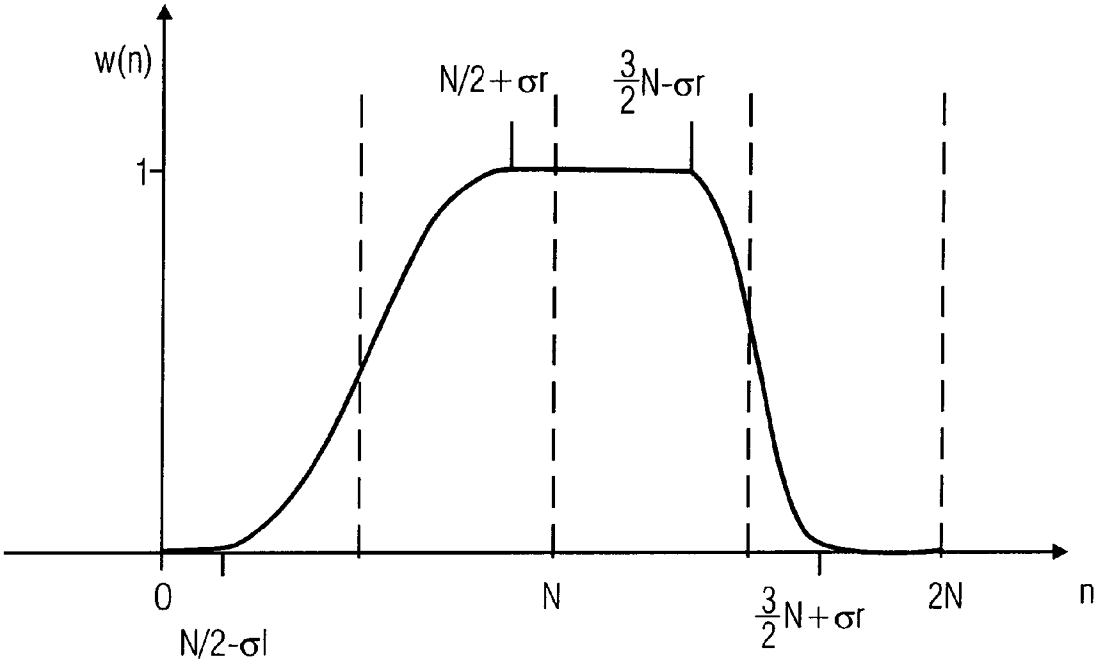
FIG. 5 shows an embodiment of a scaling window.

Thus, a resulting window for frame j of length 2N, i.e. the typical MDCT window length used for re-sampling of frames with N-samples (that is a frequency resolution of N), consists of the following segments, as illustrated in FIG. 5.

| | |
|---|---|
| $0 \le i < N/2 - \sigma l_j$ | 0 |
| $N/2 - \sigma l_j \le i < N/2 + \sigma l_j$ | $W_{l(i)}$ |
| $N/2 + \sigma l_j \le i < 3N/2 + \sigma r_j$ | 1 |
| $3N/2 - \sigma r_j \le i < 3N/2 + \sigma r_j$ | $w_r(i)$ |
| $3N/2 + \sigma r_j \le i < 2N$ | 0 |

That is, the samples 0 to N/2−σl of input block j are 0 when $D_{j+1}$ is greater than or equal to $D_j$. The samples in the interval [N/2−σl; N/2+σl] are used to fade in the scaling window. The samples in the interval [N/2+σl; N] are set to unity. The right window half, i.e. the window half used to fade out the 2N samples comprises an interval [N; 3/2N−σr), which is set to unity. The samples used to fade out the window are contained within the interval [3/2N−σr; 3/2N+σr]. The samples in the interval [3/2N+σr; 2/N] are set to 0. In general terms, scaling windows are derived, which have identical numbers of samples, wherein a first number of samples used to fade out the scaling window differs from a second number of samples used to fade in the scaling window.

The precise shape or the sample values corresponding to the scaling windows derived may, for example, be obtained (also for a non-integer overlap length) from a linear interpolation from prototype window halves, which specify the window function at integer sample positions (or on a fixed grid with even higher temporal resolution). That is, the prototype windows are time scaled to the needed fade-in and -out lengths of $2\sigma l_j$ or $2\sigma r_j$, respectively.

According to a further embodiment of the present invention, the fade-out window portion may be determined without using information on the pitch contour of the third frame. To this end, the value of $D_{j+1}$ may be limited to a predetermined limit. In some embodiments, the value may be set to a fixed predetermined number and the fade-in window portion of the second input block may be calculated based on the sampling applied to derive the first sampled representation, the second sampled representation and the predetermined number or the predetermined limit for $D_{j+1}$. This may be used in applications where low delay times are of major importance, since each input block can be processed without knowledge on the subsequent block.

In a further embodiment of the present invention, the varying length of the scaling windows may be utilized to switch between input blocks of different length.

Figure 6:
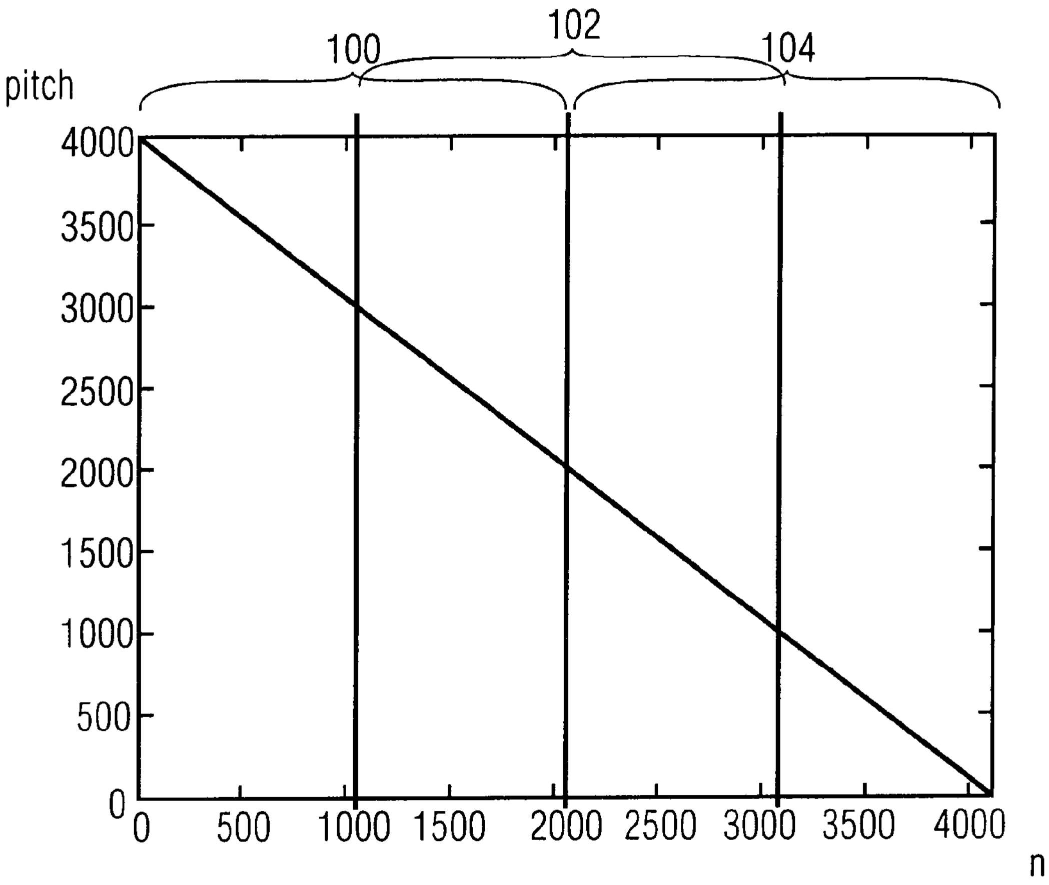
FIG. 6 shows an example of a pitch contour associated to a sequence of audio frames to be processed.
Figure 7:
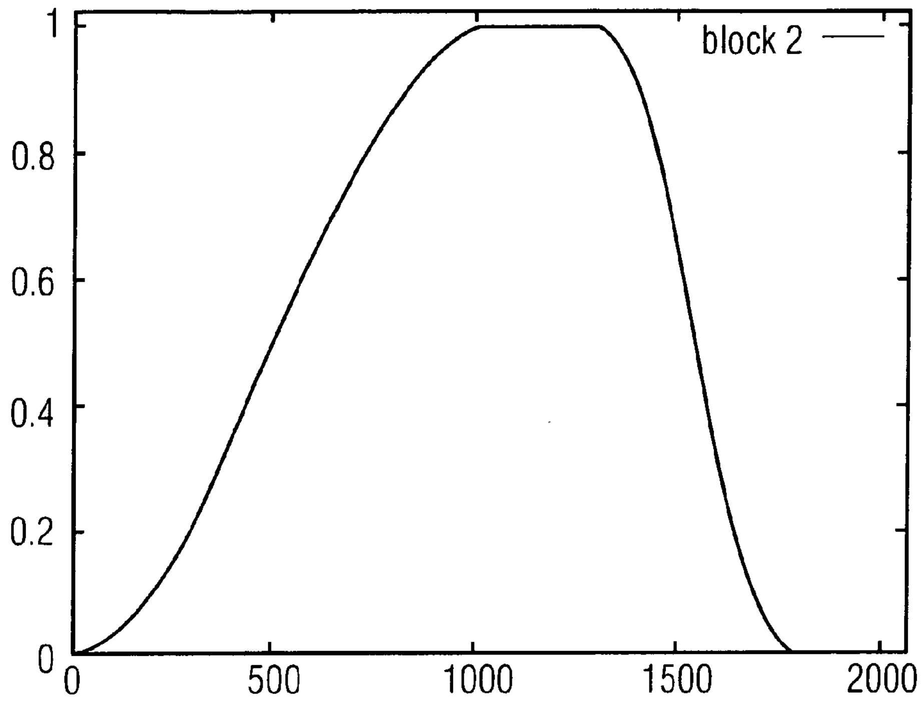
FIG. 7 shows a scaling window applied to a sampled transform block.
Figure 8:
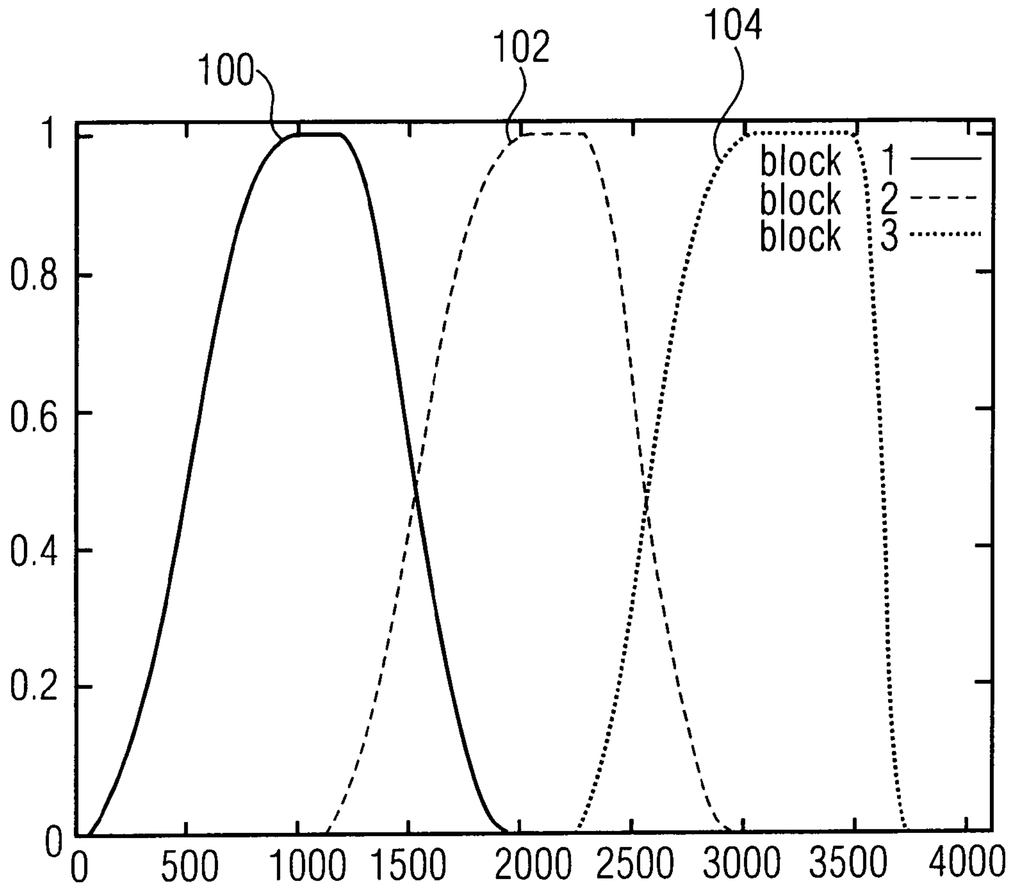
FIG. 8 shows the scaling windows corresponding to the pitch contour of FIG. 6.

FIGS. 6 to 8 illustrate an example having a frequency resolution of N=1024 and a linear-decaying pitch. FIG. 6 shows the pitch as a function of the sample number. As it becomes apparent, the pitch decay is linear and ranges from 3500 Hz to 2500 Hz in the center of MDCT block 1 (transform block 100), from 2500 Hz to 1500 Hz in the center of MDCT block 2 (transform block 102) and from 1500 Hz to 500 Hz in the center of MDCT block 3 (transform block 104). This corresponds to the following frame durations in the warped time scale (given in units of the duration ($D_2$) of transform block 102:

$$D_1 = 1.5D_2;\ D_3 = 0.5D_2.$$

Given the above, the second transform block 102 has a left overlap length $\sigma l_2 = N/2 = 512$, since $D_2 < D_1$ and a right overlap length $\sigma r_2 = N/2 \times 0.5 = 256$. FIG. 7 shows the calculated scaling window having the previously described properties.

Furthermore, the right overlap length of block 1 equals $\sigma r_1 = N/2 \times 2/3 = 341.33$ and the left overlap length of block 3 (transform block 104) is $\sigma l_3 = N/\mathbf{2} = \mathbf{512}$. As it becomes apparent, the shape of the transform windows only depend on the pitch contour of the underlying signal. FIG. 8 shows the effective windows in the un-warped (i.e. linear) time domain for transform blocks 100, 102 and 104.

Figure 9:
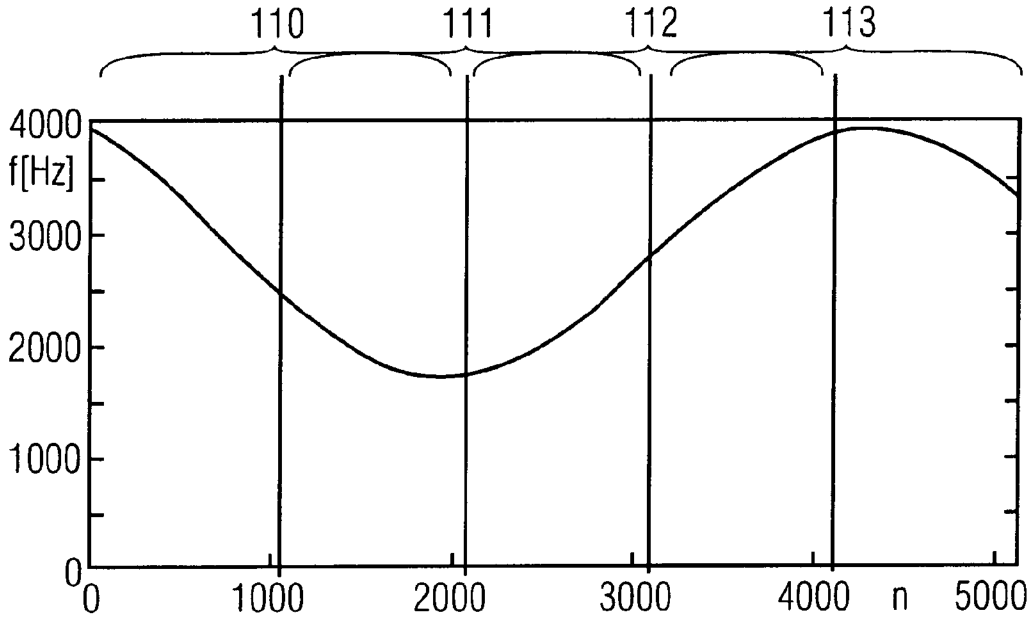
FIG. 9 shows a further example of a pitch contour of a sequence of frames of an audio signal to be processed.
Figure 10:
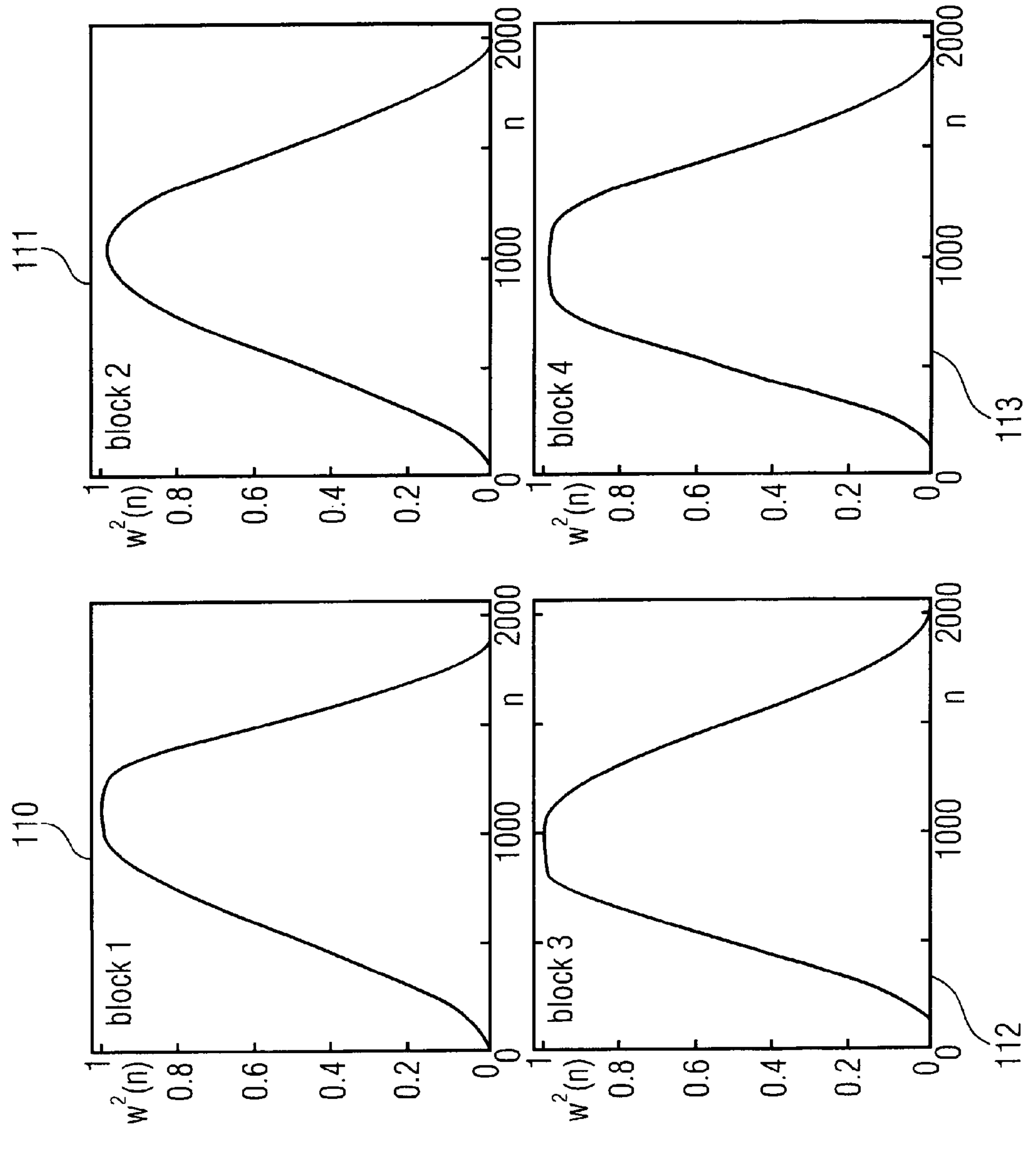
FIG. 10 shows the scaling windows used for the pitch contour of FIG. 9.
Figure 11:
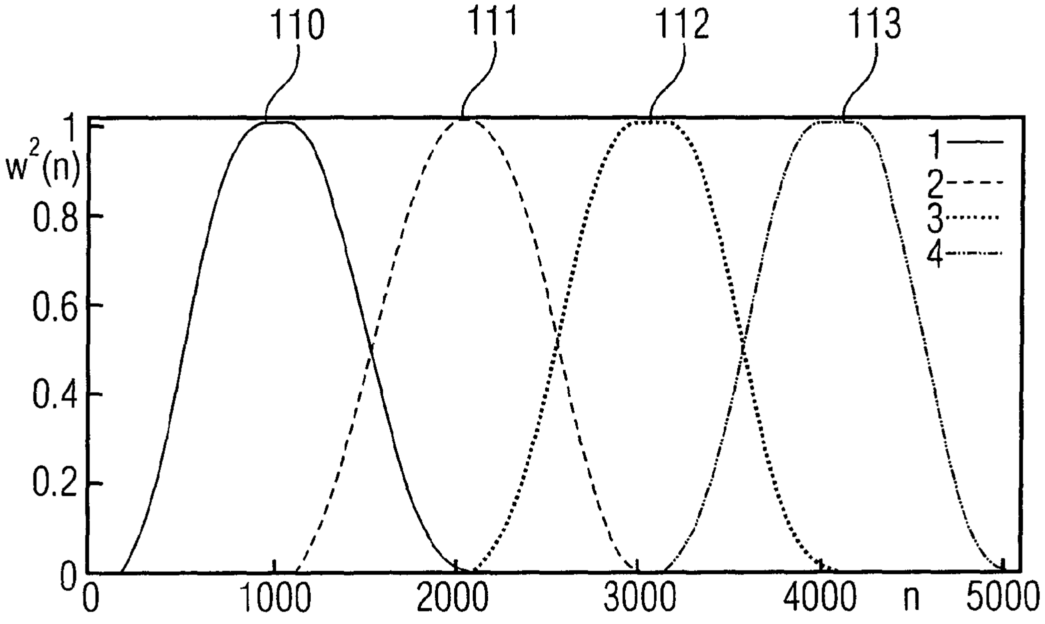
FIG. 11 shows the scaling windows of FIG. 10 transformed to the linear time scale.

FIGS. 9 to 11 show a further example for a sequence of four consecutive transform blocks 110 to 113. However, the pitch contour as indicated in FIG. 9 is slightly more complex, having the form of a Sine-function. For the exemplarily frequency resolution N(1024) and a maximum window length 2048, the accordingly-adapted (calculated) window functions in the warped time domain are given in FIG. 10. Their corresponding effective shapes on a linear time scale are illustrated in FIG. 11. It may be noted that all of the Figs. show squared window functions in order to illustrate the reconstruction capabilities of the overlap and add procedure better when the windows are applied twice (before the MDCT and after the IMDCT). The time domain aliasing cancellation property of the generated windows may be recognized from the symmetries of corresponding transitions in the warped domain. As previously determined, the Figs. also illustrate that shorter transition intervals may be selected in blocks where the pitch decreases towards the boundaries, as this corresponds to increasing sampling intervals and, therefore, to stretched effective shapes in the linear time domain. An example for this behavior may be seen in frame 4 (transform block 113), where the window function spans less than the maximum 2048 samples. However, due to the sampling intervals, which are inversely proportional to the signal pitch, the maximum possible duration is covered under the constraint that only two successive windows may overlap at any point in time.

Figure 11A:
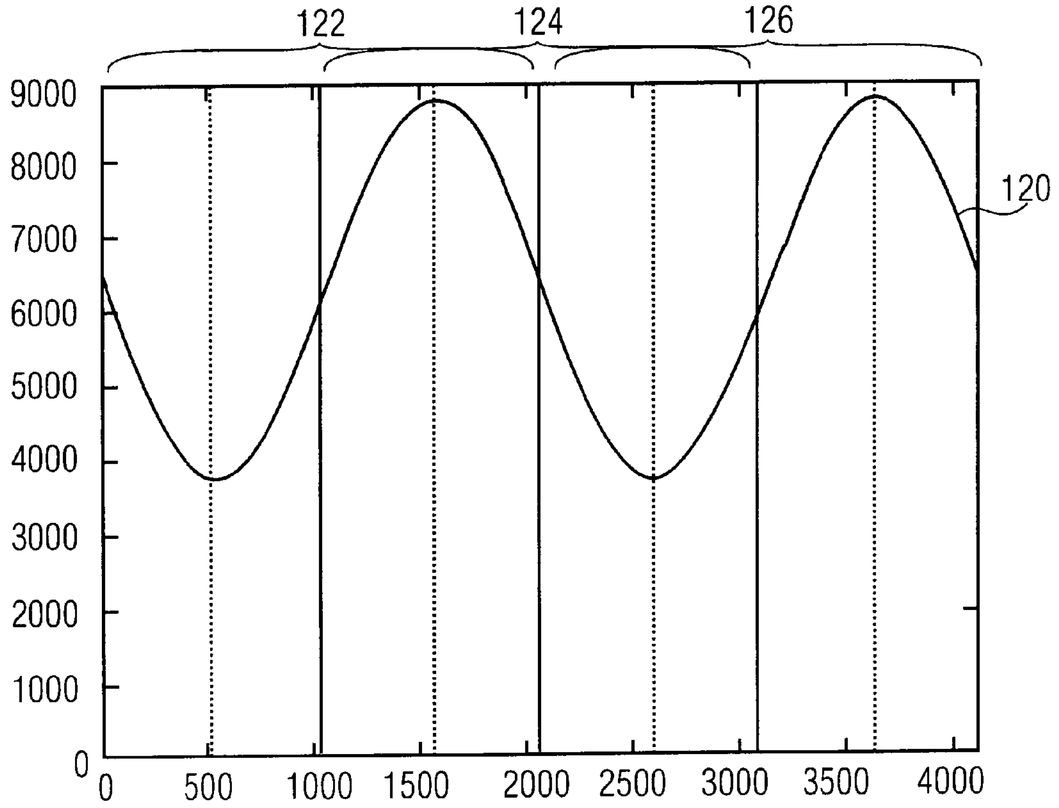
FIG. 11*a* shows a further example of a pitch contour of a sequence of frames.
Figure 11B:
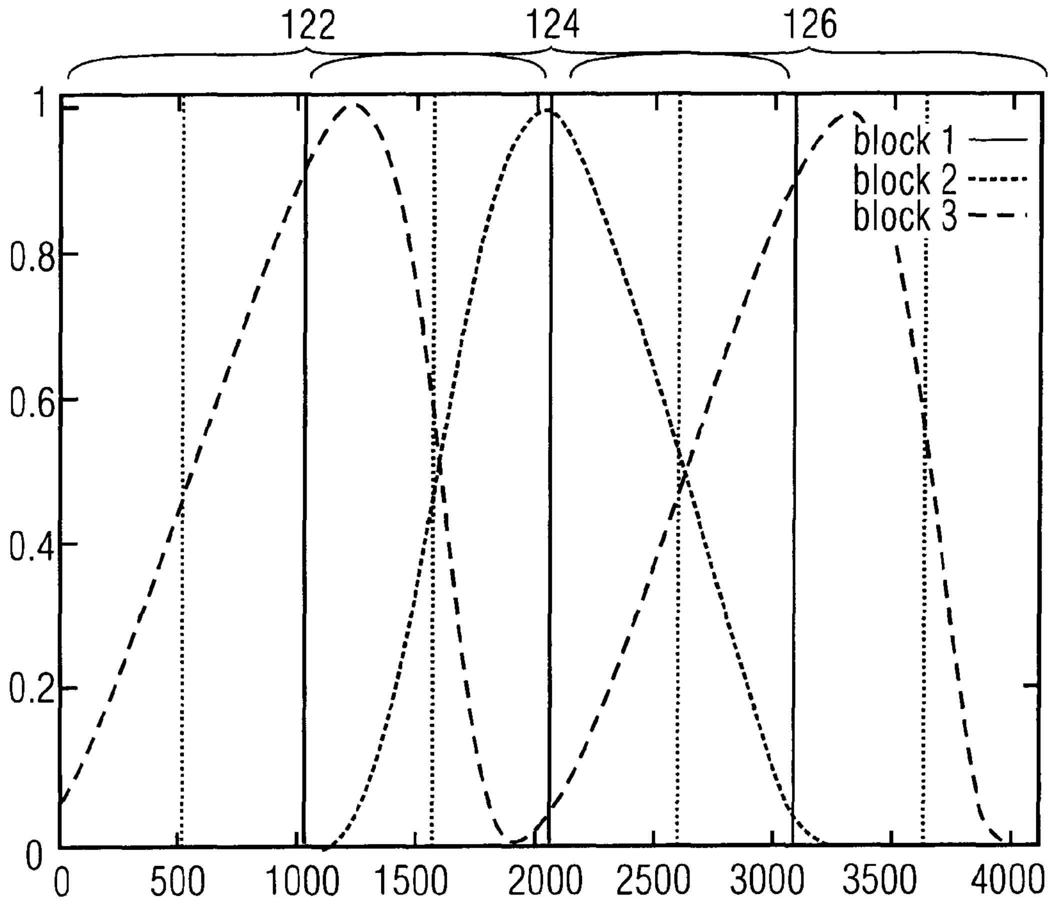
FIG. 11*b* shows the scaling windows corresponding to FIG. 11*a* on a linear time scale.

FIGS. 11*a* and 11*b* give a further example of a pitch contour (pitch contour information) and its corresponding scaling windows on a linear time scale.

FIG. 11*a* gives the pitch contour 120, as a function of sample numbers, which are indicated on the x-axis. That is, FIG. 11*a* gives warp-contour information for three consecutive transformation blocks 122, 124 and 126.

FIG. 11*b* illustrates the corresponding scaling windows for each of the transform blocks 122, 124 and 126 on a linear time scale. The transform windows are calculated depending on the sampling applied to the signal corresponding to the pitch-contour information illustrated in FIG. 11*a*. These transform windows are re-transformed into the linear time scale, in order to provide the illustration of FIG. 11*b*.

In other words, FIG. 11*b* illustrates that the re-transformed scaling windows may exceed the frame border (solid lines of FIG. 11*b*) when warped back or retransformed to the linear time scale. This may be considered in the encoder by providing some more input samples beyond the frame borders. In the decoder, the output buffer may be big enough to store the corresponding samples. An alternative way to consider this may be to shorten the overlap range of the window and to use regions of zeros and ones instead, so that the non-zero part of the window does not exceed the frame border.

As it becomes furthermore apparent from FIG. 11*b*, the intersections of the re-warped windows (the symmetry points for the time-domain aliasing) are not altered by time-warping, since these remain at the "un-warped" positions 512, 3×512, 5×512, 7×512. This is also the case for the corresponding scaling windows in the warped domain, since these are also symmetric to positions given by one quarter and three quarters of the transform block length.

Figure 12:
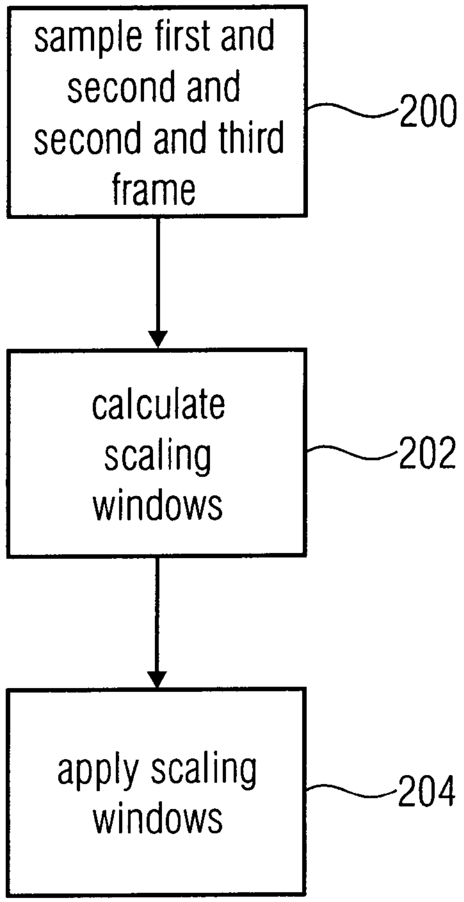
FIG. 12 shows an embodiment of a method for generating a processed representation of an audio signal.

An embodiment of a method for generating a processed representation of an audio signal having a sequence of frames may be characterized by the steps illustrated in FIG. 12.

In a sampling step 200, the audio signal is sampled within a first and a second frame of the sequence of frames, the second frame following the first frame, using information on a pitch contour of the first and the second frame to derive a first sampled representation and the audio signal is sampled within the second and a third frame, the third frame following the second frame in the sequence of frames, using information on the pitch contour of the second frame and information on a pitch contour of the third frame to derive a second sampled representation.

In a transform window calculation step 202, the first scaling window is derived for the first sampled representation and the second scaling window is derived for the second sampled representation, wherein the scaling windows depend on the sampling applied to derive the first and the second sampled representations.

In a windowing step 204, the first scaling window is applied to the first sampled representation and the second scaling window is applied to the second sampled representation.

Figure 13:
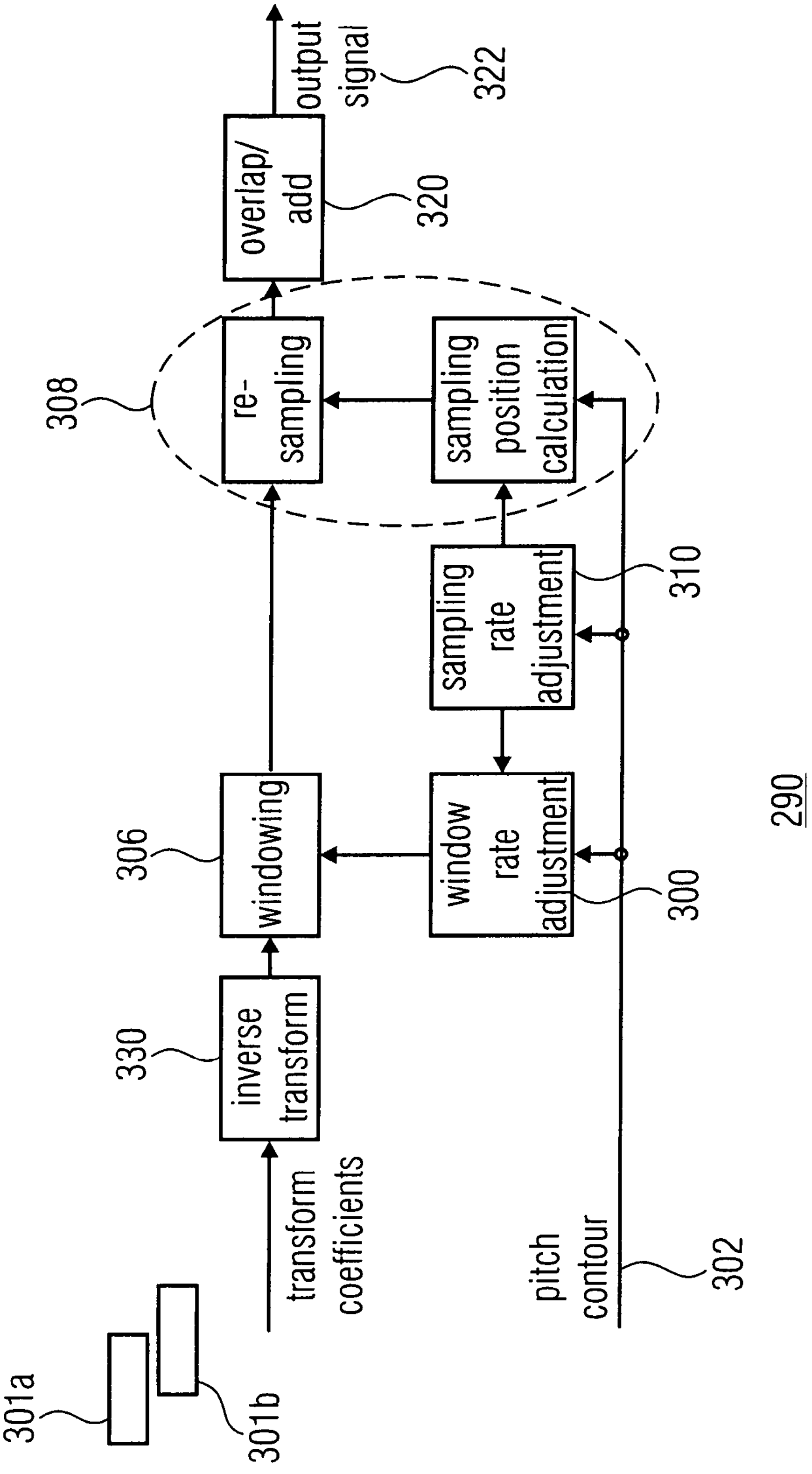
FIG. 13 shows an embodiment of a processor for processing sampled representations of an audio signal composed of a sequence of audio frames.

FIG. 13 shows an embodiment of an audio processor 290 for processing a first sampled representation of a first and a second frame of an audio signal having a sequence of frames in which the second frame follows the first frame and for further processing a second sampled representation of the second frame and of a third frame following the second frame in the sequence of frames, comprising:

A transform window calculator 300 adapted to derive a first scaling window for the first sampled representation 301*a* using information on a pitch contour 302 of the first and the second frame and to derive a second scaling window for the second sampled representation 301*b* using information on a pitch contour of the second and the third frame, wherein the scaling windows have identical numbers of samples and wherein a first number of samples used to fade out the first scaling window differs from a second number of samples used to fade in the second scaling window;

the audio processor 290 further comprises a windower 306 adapted to apply the first scaling window to the first sampled representation and to apply the second scaling window to the second sampled representation. The audio processor 290 furthermore comprises a re-sampler 308 adapted to re-sample the first scaled sampled representation to derive a first re-sampled representation using the information on the pitch contour of the first and the second frame and to re-sample the second scaled sampled representation to derive a second re-sampled representation, using the information on the pitch contour of the second and the third frame such that a portion of the first re-sampled representation corresponding to the second frame has a pitch contour within a predetermined tolerance range of a pitch contour of the portion of the second re-sampled representation corresponding to the second frame. In order to derive the scaling window, the transform window calculator 300 may either receive the pitch contour 302 directly or receive information of the re-sampling from an optional sample rate adjuster 310, which receives the pitch contour 302 and which derives a resampling strategy.

In a further embodiment of the present invention, an audio processor furthermore comprises an optional adder 320, which is adapted to add the portion of the first re-sampled representation corresponding to the second frame and the portion of the second re-sampled representation corresponding to the second frame to derive a reconstructed representation of the second frame of the audio signal as an output signal 322. The first sampled representation and the second sampled representation could, in one embodiment, be provided as an output to the audio processor 290. In a further embodiment, the audio processor may, optionally, comprise an inverse frequency domain transformer 330, which may derive the first and the second sampled representations from frequency domain representations of the first and second sampled representations provided to the input of the inverse frequency domain transformer 330.

Figure 14:
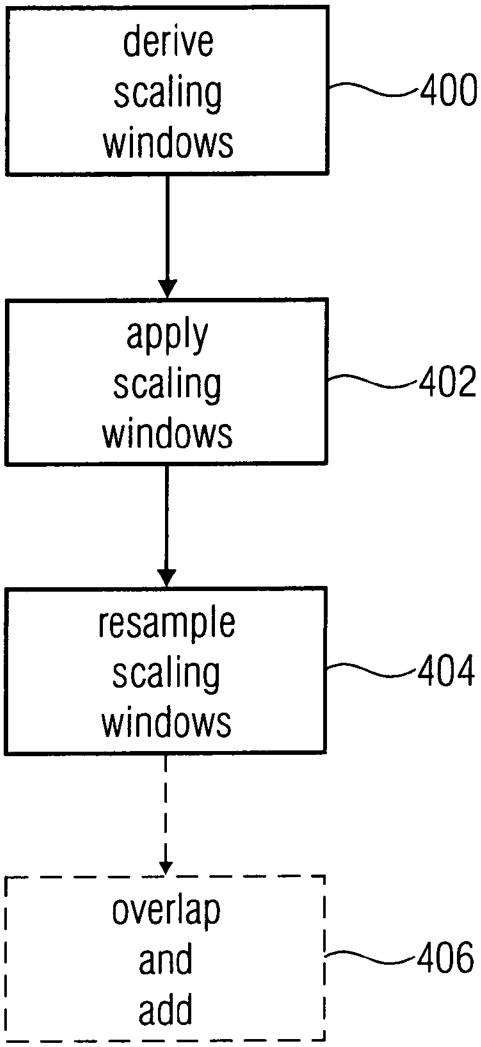
FIG. 14 shows an embodiment of a method for processing sampled representations of an audio signal.

FIG. 14 shows an embodiment of a method for processing a first sampled representation of a first and a second frame of an audio signal having a sequence of frames in which the second frame follows the first frame and for processing a second sampled representation of the second frame and of a third frame following the second frame in the sequence of frames. In a window-creation step 400, a first scaling window is derived for the first sampled representation using information on a pitch contour of the first and the second frame and a second scaling window is derived for the second sampled representation using information on a pitch contour of the second and the third frame, wherein the scaling windows have identical numbers of samples and wherein a first number of samples used to fade out the first scaling window differs from a second number of samples used to fade in the second scaling window.

In a scaling step 402, the first scaling window is applied to the first sampled representation and the second scaling window is applied to the second sampled representation.

In a re-sampling operation 402, the first scaled sampled representation is re-sampled to derive a first re-sampled representation using the information on the pitch contour of the first and the second frames and the second scaled sampled representation is re-sampled to derive a second re-sampled representation using the information on the pitch contour of the second and the third frames such that a portion of the first re-sampled representation corresponding to the first frame has a pitch contour within a predetermined tolerance range of a pitch contour of the portion of the second re-sampled representation corresponding to the second frame.

According to a further embodiment of the invention, the method comprises an optional synthesis step 406 in which the portion of the first re-sampled representation corresponding to the second frame and the portion of the second re-sampled representation corresponding to the second frame are combined to derive a reconstructed representation of the second frame of the audio signal.

In summarizing, the previously-discussed embodiments of the present invention allow to apply an optimal pitch contour to a continuous or pre-sampled audio signal in order to re-sample or transform the audio signal into a representation, which may be encoded resulting in an encoded representation with high quality and a low bit rate. In order to achieve this, the re-sampled signal may be encoded using a frequency domain transform. This could, for example, be the modified discrete cosine transform discussed in the previous embodiments. However, other frequency domain transforms or other transforms could alternatively be used in order to derive an encoded representation of an audio signal with a low bit rate.

Nevertheless, it is also possible to use different frequency transforms to achieve the same result, such as, for example, a Fast Fourier transform or a discrete cosine transform in order to derive the encoded representation of the audio signal.

It goes without saying that the number of samples, i.e. the transform blocks used as an input to the frequency domain transform is not limited to the particular example used in the previously-described embodiments. Instead, an arbitrary block frame length may be used, such as, for example, blocks consisting of 256, 512, 1024 blocks.

Arbitrary techniques to sample or to re-sample the audio signals may be used to implement in further embodiments of the present invention.

An audio processor used to generate the processed representation may, as illustrated in FIG. 1, receive the audio signal and the information on pitch contour as separate inputs, for example, as separate input bit streams. In further embodiments, however, the audio signal and the information on pitch contour may be provided within one interleaved bit stream, such that the information of the audio signal and the pitch contour are multiplexed by the audio processor. The same configurations may be implemented for the audio processor deriving a reconstruction of the audio signal based on the sampled representations. That is, the sampled representations may be input as a joint bit stream together with the pitch contour information or as two separate bit streams. The audio processor could furthermore comprise a frequency domain transformer in order to transform the re-sampled representations into transform coefficients, which are then transmitted together with a pitch contour as an encoded representation of the audio signal, such as to efficiently transmit an encoded audio signal to a corresponding decoder.

The previously described embodiments do, for the sake of simplicity, assume that the target pitch to which the signal is re-sampled is unity. It goes without saying that the pitch may be any other arbitrary pitch. Since the pitch can be applied without any constraints to the pitch contour, it is furthermore possible to apply a constant pitch contour in case no pitch contour can be derived or in case no pitch contour is delivered.

Depending on certain implementation requirements of the inventive methods, the inventive methods can be implemented in hardware or in software. The implementation can be performed using a digital storage medium, in particular a disk, DVD or a CD having electronically readable control signals stored thereon, which cooperate with a programmable computer system such that the inventive methods are performed. Generally, the present invention is, therefore, a computer program product with a program code stored on a machine readable carrier, the program code being operative for performing the inventive methods when the computer program product runs on a computer. In other words, the inventive methods are, therefore, a computer program having a program code for performing at least one of the inventive methods when the computer program runs on a computer.

While the foregoing has been particularly shown and described with reference to particular embodiments thereof, it will be understood by those skilled in the art that various other changes in the form and details may be made without departing from the spirit and scope thereof. It is to be understood that various changes may be made in adapting to different embodiments without departing from the broader concepts disclosed herein and comprehended by the claims that follow.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

What is claimed is:

1. An audio processor for generating a processed representation of an audio signal comprising a sequence of frames, the audio processor comprising:

a sampler adapted to sample the audio signal within a first and a second frame of the sequence of frames, the second frame following the first frame, the sampler using information on a pitch contour of the first and the second frame to derive a first sampled representation and to sample the audio signal within the second and a third frame, the third frame following the second frame in the sequence of frames using the information on the pitch contour of the second frame and information on a pitch contour of the third frame to derive a second sampled representation;

a transform window calculator adapted to derive a first scaling window for the first sampled representation and a second scaling window for the second sampled representation, the scaling windows depending on the sampling applied to derive the first sampled representation or the second sampled representation; and a windower adapted to apply the first scaling window to the first sampled representation and the second scaling window to the second sampled representation to derive a processed representation of the first, second and third audio frames of the audio signal, wherein at least one of the sampler, the transform window calculator, and the windower comprises a hardware implementation.

2. The audio processor according to claim 1, wherein the sampler is operative to sample the audio signal such that a pitch contour within the first and second sampled representations is more constant than a pitch contour of the audio signal within the corresponding first, second and third frames.

3. The audio processor according to claim 1, wherein the sampler is operative to re-sample a sampled audio signal comprising N samples in each of the first, second and third frames such, that each of the first and second sampled representations comprises 2 N samples.

4. The audio processor according to claim 3, wherein the sampler is operative to derive a sample i of the first sampled representation at a position given by the fraction u between the original sampling positions k and (k+1) of the 2N samples of the first and second frames, the fraction u depending on a time contour associating the sampling positions used by the sampler and the original sampling positions of the sampled audio signal of the first and second frames.

5. The audio processor according to claim 4, wherein the sampler is operative to use a time contour derived from the pitch contour pi of the frames according to the following equation:

$$\text{time\_contour}_{i+1}=\text{time\_contour}_i+(p_i x I),$$

wherein a reference time interval I for the first sampled representation is derived from a pitch indicator D derived from the pitch contour p, according to:

$$D = \sum_{i=0}^{2N-1} p_i,\ I = 2N / D.$$

6. The audio processor according to claim 1, wherein the transform window calculator is adapted to derive scaling windows with identical numbers of samples, wherein a first number of samples used to fade out the first scaling window differs from a second number of samples used to fade in the second scaling window.

7. The audio processor according to claim 1, wherein the transform window calculator is adapted to derive a first scaling window in which a first number of samples is lower than a second number of samples of the second scaling window when the combined first and second frames comprise a higher mean pitch than the second and the third combined frames or to derive a first scaling window in which the first number of samples is higher than the second number of samples of the second scaling window when the first and the second combined frames comprise a lower mean pitch than the second and third combined frames.

8. The audio processor according to claim 6, wherein the transform window calculator is adapted to derive scaling windows in which a number of samples before the samples used to fade out and in which a number of samples after the samples used to fade in are set to unity and in which the number of samples after the samples used to fade out and before the samples used to fade in are set to 0.

9. The audio processor according to claim 8, wherein the transform window calculator is adapted to derive the number of samples used to fade in and used to fade out dependent from a first pitch indicator Dj of the first and second frames comprising samples 0, . . . , 2N−1 and from a second pitch indicator Dj+1 of the second and the third frame comprising samples N, . . . , 3N−1, such that the number of samples used to fade in is:

$$N \text{ if } D_{j+1} \le D_j \text{ or}$$

$$N \times \frac{D_{j+1}}{D_j} \text{ if } D_j > D_{j+}; \text{ and}$$

the first number of samples used to fade out is:

$$N \text{ if } D_j \le D_{j+1} \text{ or}$$

$$N \times \frac{D_{j+1}}{D_j} \text{ if } D_j > D_{j+1}$$

wherein the pitch indicators $D_j$ and $D_{j+1}$ are derived from the pitch contour $p_i$ according to the following equations:

$$D_{j+1} = \sum_{i=N}^{3N-1} p_i \text{ and } D_j = \sum_{i=0}^{2N-1} p_i.$$

10. The audio processor according to claim 8, wherein the window calculator is operative to derive the first and second number of samples by re-sampling a predetermined fade in and fade out window with equal numbers of samples to the first and second number of samples.

11. The audio processor according to claim 1, wherein the windower is adapted to derive a first scaled sampled representation by applying the first scaling window to the first sampled representation and to derive a second scaled sampled representation by applying the second scaling window to the second scaled representation.

12. The audio processor according to claim 1, wherein the windower further comprises a frequency domain transformer to derive a first frequency domain representation of a scaled first re-sampled representation and to derive a second frequency domain representation of a scaled second re-sampled representation.

13. The audio processor according to claim 1, further comprising a pitch estimator adapted to derive the pitch contour of the first, second and third frames.

14. The audio processor according to claim 12, further comprising an output interface for outputting the first and the second frequency domain representations and the pitch contour of the first, second and third frames as an encoded representation of the second frame.

15. An audio processor for processing a first sampled representation of a first and a second frame of an audio signal comprising a sequence of frames in which the second frame follows the first frame and for processing a second sampled representation of the second frame and of a third frame of the audio signal following the second frame in the sequence of frames, comprising:

a transform window calculator adapted to derive a first scaling window for the first sampled representation using information on a pitch contour of the first and the second frame and to derive a second scaling window for the second sampled representation using information on a pitch contour of the second and the third frames, wherein the scaling windows comprise an identical number of samples and wherein a first number of samples used to fade out the first scaling window differs from a second number of samples used to fade in the second scaling window;

a windower adapted to apply the first scaling window to the first sampled representation and to apply the second scaling window to the second sampled representation;

and a re-sampler adapted to re-sample the first scaled sampled representation to derive a first re-sampled representation using the information on the pitch contour of the first and the second frame and to re-sample the second scaled sampled representation to derive a second re-sampled representation using the information on the pitch contour of the second and the third frames, the re-sampling depending on the scaling windows derived, wherein at least one of the transform window calculator, the windower, and the re-sampler comprises a hardware implementation.

16. The audio processor according to claim 15, further comprising an adder adapted to add the portion of the first re-sampled representation corresponding to the second frame and the portion of the second re-sampled representation corresponding to the second frame to derive a reconstructed representation of the second frame of the audio signal.

17. A method for generating a processed representation of an audio signal comprising a sequence of frames comprising:

sampling, by a sampler, the audio signal within a first and a second frame of the sequence of frames, the second frame following the first frame, the sampling using information on a pitch contour of the first and the second frame to derive a first sampled representation;

sampling, by the sampler, the audio signal within the second and a third frame, the third frame following the second frame in the sequence of frames, the sampling using the information on the pitch contour of the second frame and information on a pitch contour of the third frame to derive a second sampled representation;

deriving, by a transform window calculator, a first scaling window for the first sampled representation and a second scaling window for the second sampled representation, the scaling windows depending on the samplings applied to derive the first sampled representation or the second sampled representation; and applying, by a windower, the first scaling window to the first sampled representation and applying the second scaling window to the second sampled representation, wherein at least one of the sampler, the transform window calculator, and the windower comprises a hardware implementation.

18. A method for processing a first sampled representation of a first and a second frame of an audio signal comprising a sequence of frames in which the second frame follows the first frame and for processing a second sampled representation of the second frame and of a third frame of the audio signal following the second frame in the sequence of frames, comprising:

deriving, by a transform window calculator, a first scaling window for the first sampled representation using information on a pitch contour of the first and the second frame and deriving a second scaling window for the second sampled representation using information on a pitch contour of the second and the third frame, wherein the scaling windows are derived such that they comprise an identical number of samples, wherein a first number of samples used to fade out the first scaling window differs from a second number of samples used to fade in the second scaling window;

applying, by a windower, the first scaling window to the first sampled representation and the second scaling window to the second sampled representation; and re-sampling, by a re-sampler, the first scaled sampled representation to derive a first re-sampled representation using the information on the pitch contour of the first and the second frame and re-sampling the second scaled sampled representation to derive a second re-sampled representation using the information on the pitch contour of the second and the third frame the re-sampling depending on the scaling windows derived, wherein at least one of the transform window calculator, the windower, and the re-sampler comprises a hardware implementation.

19. The method of claim 18, further comprising:

adding, by an adder, the portion of the first re-sampled representation corresponding to the second frame and the portion of the second re-sampled representation corresponding to the second frame to derive a reconstructed representation of the second frame of the audio signal.

20. A non-transitory computer readable storage medium having stored thereon a computer program with program code for executing, when the computer program runs on a computer, a method for generating a processed representation of an audio signal comprising a sequence of frames, the method comprising:

sampling the audio signal within a first and a second frame of the sequence of frames, the second frame following the first frame, the sampling using information on a pitch contour of the first and the second frame to derive a first re-sampled representation;

sampling the audio signal within the second and a third frame, the third frame following the second frame in the sequence of frames, the sampling using the information on the pitch contour of the second frame and information on a pitch contour of the third frame to derive a second sampled representation;

deriving a first scaling window for the first sampled representation and a second scaling window for the second sampled representation, the scaling windows depending on the samplings applied to derive the first sampled representations or the second sampled representation; and applying the first scaling window to the first sampled representation and applying the second scaling window to the second sampled representation.

21. A non-transitory computer readable storage medium having stored thereon a computer program with program code for executing, when the computer program runs on a computer, a method for processing a first sampled representation of a first and a second frame of an audio signal comprising a sequence of frames in which the second frame follows the first frame and for processing a second sampled representation of the second frame and of a third frame of the audio signal following the second frame in the sequence of frames, the method comprising:

deriving a first scaling window for the first sampled representation using information on a pitch contour of the first and the second frame and deriving a second scaling window for the second sampled representation using information on a pitch contour of the second and the third frame, wherein the scaling windows are derived such that they comprise an identical number of samples, wherein a first number of samples used to fade out the first scaling window differs from a second number of samples used to fade in the second scaling window;

applying the first scaling window to the first sampled representation and the second scaling window to the second sampled representation; and re-sampling the first scaled sampled representation to derive a first re-sampled representation using the information on the pitch contour of the first and the second frame and re-sampling the second scaled sampled representation to derive a second re-sampled representation using the information on the pitch contour of the second and the third frame the re-sampling depending on the scaling windows derived.

* * * * *

UNITED STATES PATENT AND TRADEMARK OFFICE

CERTIFICATE OF CORRECTION

PATENT NO. : 8,700,388 B2
APPLICATION NO. : 12/668912
DATED : April 15, 2014
INVENTOR(S) : Edler et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1038 days.

Signed and Sealed this
Twenty-ninth Day of September, 2015

Michelle K. Lee

Michelle K. Lee
*Director of the United States Patent and Trademark Office*